(12) United States Patent
Bittar (10) Patent No.: US 10,864,064 B1
(45) Date of Patent: Dec. 15, 2020

(54) HYBRID DENTURES

(71) Applicant: Tom Bittar, Milltown, NJ (US)

(72) Inventor: Tom Bittar, Milltown, NJ (US)

( * ) Notice: Subject to any disclaimer, the term of this patent is extended or adjusted under 35 U.S.C. 154(b) by 0 days.

(21) Appl. No.: 16/889,915

(22) Filed: Jun. 2, 2020

(51) Int. Cl.
*B22C 9/00* (2006.01)
*B22C 9/18* (2006.01)
*A61C 13/34* (2006.01)
*A61C 13/00* (2006.01)
*A61C 13/10* (2006.01)

(52) U.S. Cl.
CPC .......... *A61C 13/34* (2013.01); *A61C 13/0028* (2013.01); *A61C 13/102* (2013.01)

(58) Field of Classification Search
CPC .. B22C 9/00; B22C 9/18; A61C 13/00; A61C 13/10; A61C 13/34
USPC ................... 164/6, 17, 45; 29/896.1, 896.11; 433/213
See application file for complete search history.

(56) References Cited

U.S. PATENT DOCUMENTS

2018/0000568 A1 * 1/2018 Berger ................ A61C 13/275

* cited by examiner

*Primary Examiner* — Kevin P Kerns
(74) *Attorney, Agent, or Firm* — Walter J. Tencza, Jr.

(57) ABSTRACT

A method including modifying a known upper denture to form a final upper denture by a series of steps which may include making holes in a gums section made of a first material of the known upper denture, cutting away a palate section, and applying a gold and silicon mixture to make a new palate section, to insert into the holes in the gums section, and to cover the first material. The method may also include modifying a known lower denture to form a final lower denture by a series of steps which may include making holes in a gums section made of a first material of the known lower denture, and applying a gold and silicon mixture to insert into the holes, and to cover the first material. The first material may be nylon.

16 Claims, 7 Drawing Sheets

HYBRID DENTURES

FIELD OF THE INVENTION

This invention relates to dentures.

BACKGROUND OF THE INVENTION

Generally, known dentures, are typically made in the following manner as known in the art. Firstly, dental impressions of a person's upper and lower mouth are made, wherein the person typically has lost all of their teeth. The dental impressions, as known, are made by putting a gooey material, such as alginate, which is in a tray, into either a lower or upper part of a person's mouth, to take either lower or upper dental impressions, respectively. The alginate hardens into upper and lower molds, and then plaster or liquid is poured with respect to the molds, and then this liquid or plaster hardens to form upper and lower hard models. The upper and lower hard models correspond to a person's upper and lower jaws, wherein the person typically does not have teeth anymore.

Next it is determine how the particular person bites together. Upper and lower bites or bite registrations are prepared which typically are colored pink and are made of wax.

Next, the upper bite in the upper model or jaw, and the lower bite in the lower model or jaw, are mounted or placed in an artificial jaw articulator, which is adjusted based on the upper bite in the upper jaw, and the lower bite in the lower jaw, so that the artificial jaw articulator is meant to mimic the particular person's jaw function.

Then the upper and lower bites or registrations are removed from the articulator.

Then heated wax is used to apply and hold acrylic teeth to the upper model or jaw and the lower model or jaw, forming an upper set of teeth attached by wax to the upper jaw and a lower set of teeth attached by wax to the lower jaw.

Next a waxup is done to make the pink portion or wax appear more natural.

The wax dries with an upper set of teeth attached to the upper model or jaw and a lower set of teeth attached to the lower model or jaw.

Next the upper set of teeth and wax attached to the upper model are placed into a first half or bottom half of a first flask, and then plaster is placed so that it surrounds the upper model. After the plaster hardens, a second or upper half of the first flask is placed on top of the first flask, and then plaster is placed on and surrounding the upper set of teeth and wax.

Similarly, the lower set of teeth and wax attached to the lower model are placed into a first half or bottom half of a second flask, and then plaster is placed so that it surrounds the lower model. After the plaster hardens, a second or upper half of the second flask is placed on top of the second flask, and then plaster is placed on and surrounding the lower set of teeth and wax.

After all the plaster hardens and now encases both the upper set of teeth, wax, and upper model in the first flask and the lower set of teeth, wax, and lower model in the first flask, the two flasks are placed in boiling water to heat the wax, to cause it to melt so it can be removed.

After the wax is removed, the first and second flasks are split into halves and then the remaining teeth and models are coated in separator fluid to stop acrylic (which will be applied in a subsequent step) from sticking to models.

The first and second flasks are then assembled again, with the particular teeth and models in them, and then acrylic is injected into the first and second flasks such that the acrylic fills the voids left behind by the melted, removed wax.

The acrylic in the flasks goes through a curing process of six to eight hours.

After the acrylic is cured in the flasks, the flasks are separated into halves, the plaster shells are removed, by breaking carefully, so that the upper model and upper denture including teeth and acrylic pink gums portion, and lower model and lower denture, including teeth and acrylic pink or gums portion are revealed.

The upper denture including teeth and acrylic gums portion is taken out of the upper model, and polished to form the final upper denture.

The lower denture including teeth and acrylic gums portion is taken out of the lower model and polished to form the final lower denture.

Known dentures made with gums section and/or teeth section entirely of acrylic can be uncomfortable and may not be optimally resistant to bacteria. Although nylon, such as flexible nylon has been used as a material for gum sections in some dentures, the use of all nylon for gum sections is not optimal. There is a need for better dentures which are more comfortable for a patient and provide a better fit in a patient's mouth.

SUMMARY OF THE INVENTION

In at least one embodiment, a method is provided comprising: modifying a known upper denture to form a first modified upper denture by making holes in a gums section of the known upper denture, wherein the known upper denture includes a gums section made of a first material, a palate section, and a plurality of teeth, and wherein the first modified upper denture includes a gums section, a palate section, and a plurality of teeth; modifying a known lower denture to form a first modified lower denture by making holes in a gums section of the known lower denture, wherein the known lower denture includes a gums section made of the first material, and a plurality of teeth, and wherein the first modified lower denture includes a gums section, and a plurality of teeth; modifying the first modified upper denture by removing the palate section of the first modified upper denture to form a second modified upper denture, wherein the second modified upper denture includes a gums section and a plurality of teeth; trimming the second modified upper denture to form a third modified upper denture, wherein the third modified upper denture includes a gums section and a plurality of teeth; putting the third modified upper denture into a hard upper impression; and putting the first modified lower denture into a hard lower impression.

The method may further include placing the third modified upper denture, while in the hard upper impression, into an artificial jaw articulator so that the third modified upper denture and hard upper impression act as an upper jaw; placing the first modified lower denture, while in the hard lower impression, into the artificial jaw articulator so that the first modified lower denture and the hard lower impression act as a lower jaw; applying wax to outer surfaces of the gums section of the third modified upper denture, and using additional wax to form a new palate section, thereby forming a fourth modified upper denture including a gums section covered with wax, a palate section made of wax, and a plurality of teeth; applying wax to outer surfaces of the gums section of the first modified lower denture thereby forming a second modified upper denture including a gums section covered with wax, and a plurality of teeth; putting the fourth modified upper denture and hard upper impression inside a first half of a first flask, and inserting wet plaster into the first half of the first flask so that the wet plaster in the first half of the first flask surrounds the hard upper impression; putting the second modified lower denture and hard lower impression inside a first half of a second flask, and inserting wet plaster into the first half of the second flask so that the wet plaster in the first half of the second flask surrounds the hard lower impression.

In at least one embodiment of the present invention, after the plaster in the first half of the first flask dries, putting the second half of the first flask on top of the first half of the first flask, and pouring wet plaster on top of the fourth modified upper denture; after the plaster in the first half of the second flask dries, putting the second half of the second flask on top of the first half of the second flask, and pouring wet plaster on top of the second modified lower denture; after the plaster in the second half of the first flask has dried, applying heat to the first flask so that the wax of the fourth modified upper denture melts and further comprising removing the melted wax of the fourth modified upper denture to form a fifth modified upper denture having voids where the wax was of the fourth modified upper denture was located; after the plaster in the second half of the second flask has dried, applying heat to the second flask, so that the wax of the second modified lower denture melts and further comprising removing the melted wax from the second modified lower denture to form a third modified lower denture having voids where the wax of the second modified lower denture was located.

The method may further include applying gold and silicon mixture to the fifth modified upper denture to form a sixth modified upper denture having a gums section comprised of a mixture of gold and silicon covering the first material, wherein the first material differs from the mixture of gold and silicon, a palate section of the mixture of gold and silicon, and a plurality of teeth; applying gold and silicon mixture to the third modified lower denture to form a fourth modified lower denture having a gums section comprised of a mixture of gold and silicon covering the first material, wherein the first material differs from the mixture of gold and silicon; and a plurality of teeth; removing sixth modified upper denture from hardened plaster and trimming sixth modified upper denture to form final upper denture; and removing fourth modified lower denture from hardened plaster and trimming fourth modified lower denture to form final lower denture.

In at least one embodiment, the present invention provides a final upper denture and a final lower denture made from one or more steps of the method or process above. In at least one embodiment, the first material may be nylon.

DETAILED DESCRIPTION OF THE DRAWINGS

Figure 1A:
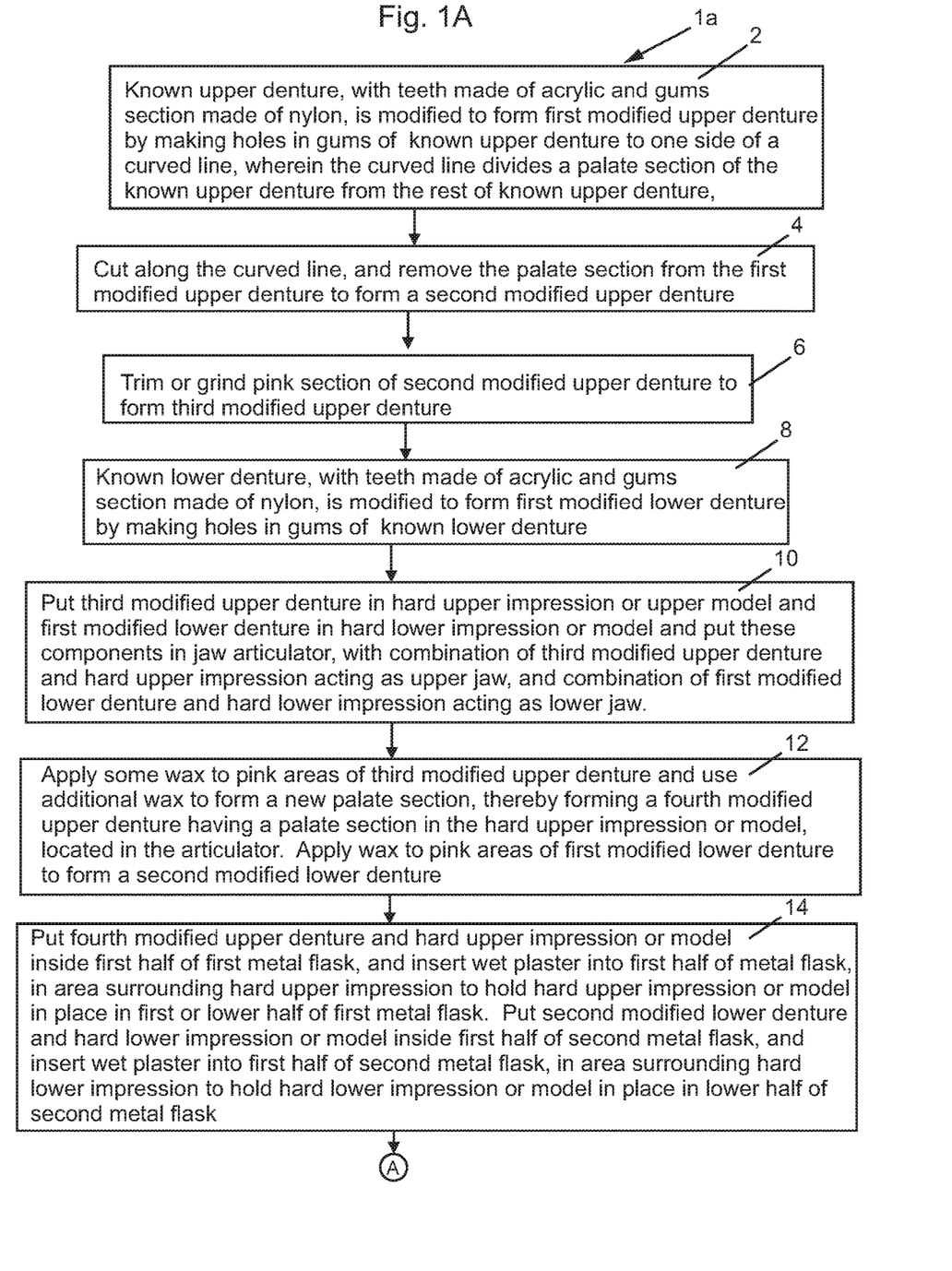
FIG. 1A is a flow chart of a first part of a method in accordance with an embodiment of the present invention.
Figure 1B:
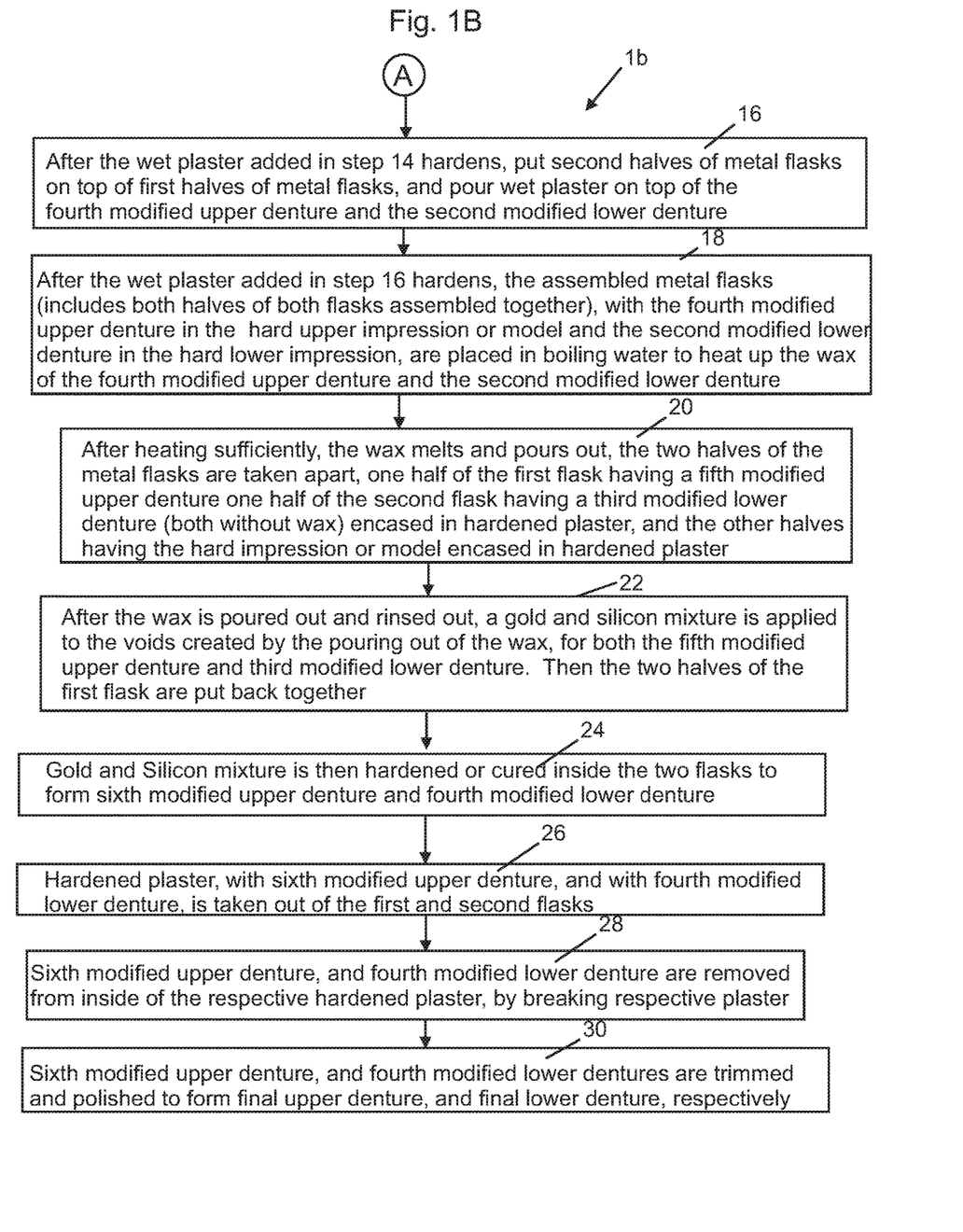
FIG. 1B is a flow chart of a second part of the method referred to in FIG. 1A, wherein the flow chart of FIG. 1B is a continuation of the flow chart of FIG. 1A.

FIG. 1A is a flow chart 1a of a first part of a method in accordance with an embodiment of the present invention. FIG. 1B is a flow chart 1b of a second part of the method referred to in FIG. 1A, wherein the flow chart 1b of FIG. 1B is a continuation of the flow chart 1a of FIG. 1A. The method of FIGS. 1A-1B may be a method of making a final upper denture 300 shown in FIG. 5 and a final lower denture 400 shown in FIG. 6, in accordance with an embodiment of the present invention.

Figure 2:
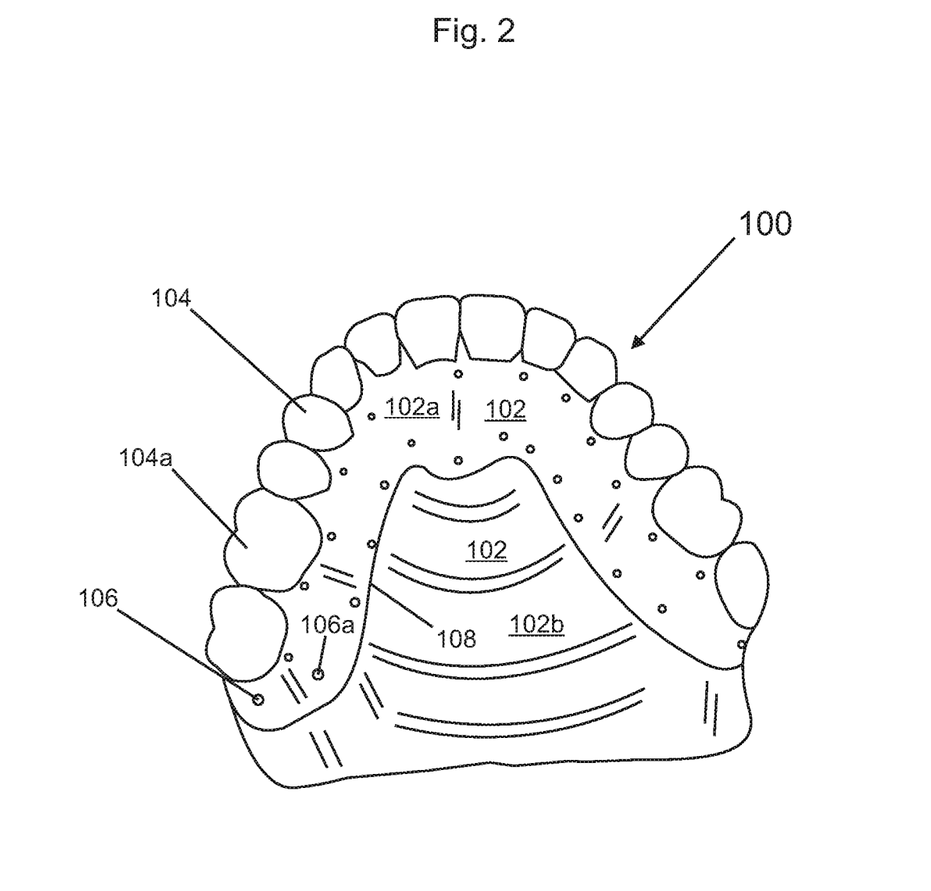
FIG. 2 is a bottom perspective view of a first modified upper denture in accordance with an embodiment of the present invention.

Referring to FIGS. 1A-1B, at step 2 a known upper denture, with teeth made of acrylic, and preferably with gums section made of nylon, preferably a flexible nylon, is modified to form first modified upper denture 100, shown in FIG. 2, by making a plurality of holes 106 in gums, or pink section 102, of the known upper denture to one side, closer to teeth 104, of a curved line 108, wherein the curved line 108 divides a palate section 102b, shown in FIG. 2, of the first modified upper denture 100 from the rest of the first modified upper denture 100. The holes 106 may be made with a drill or in any other known manner.

The pink section 102 may include palate section 102b, and section 102a. Other than the holes 106 and the curved line 108, the first modified upper denture 100 may be identical to a known upper denture, wherein the pink or gums section 102 is made of nylon, preferably a flexible nylon, and the teeth 104 (including tooth 104a) are made of acrylic.

Each of the plurality of holes 106, such as hole 106a, shown in FIG. 2, preferably goes all the way through the section 102a so that one can see through the holes 106 though the section 102a. Having holes 106 go all the way through section 102a allows a gold and silicon mixture to enter the interior of the nylon section 102a in one or more later steps of a method in accordance with an embodiment of the present invention. The nylon section 102a may be referred to as a nylon frame.

Figure 3:
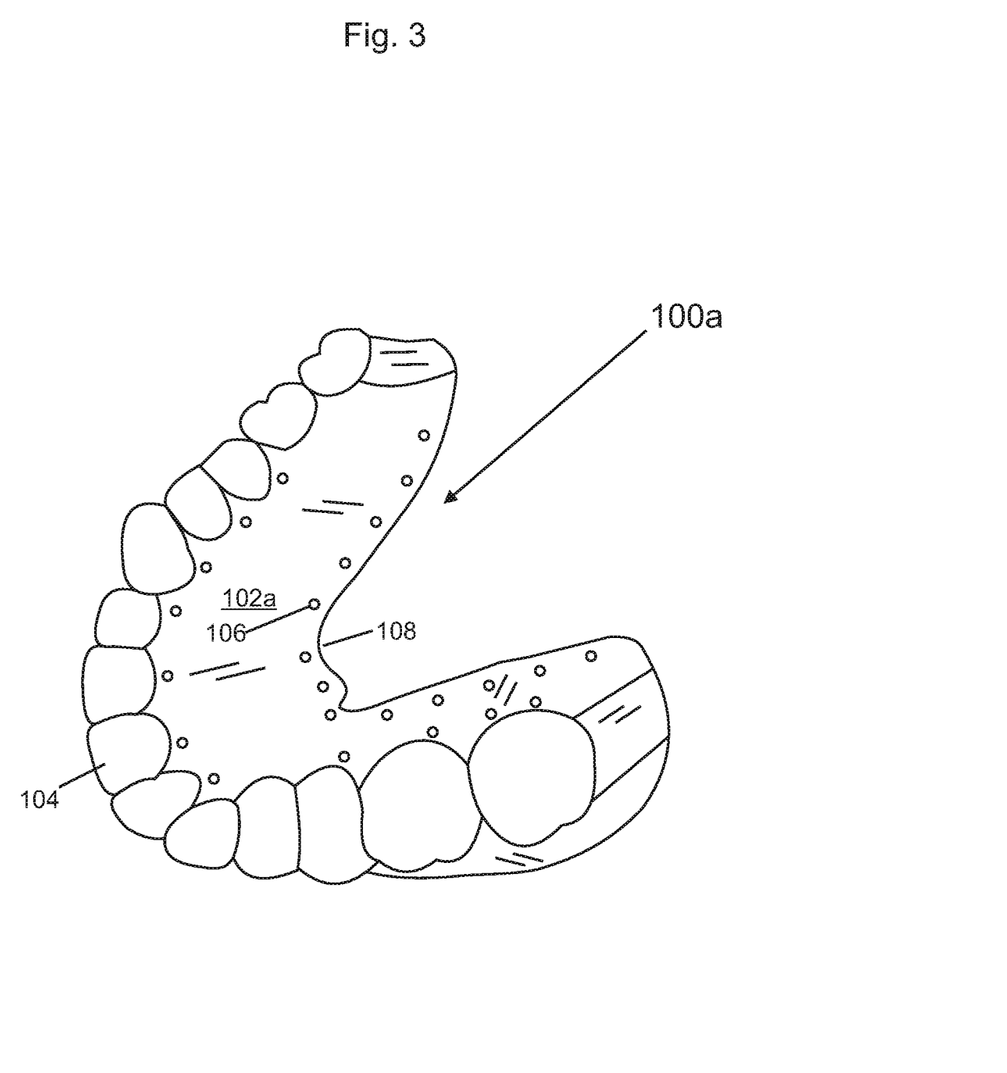
FIG. 3 is a bottom perspective view of a second modified upper denture in accordance with an embodiment of the present invention.

At step 4, a cut is made along the curved line 108, and the palate section 102b is removed from the first modified upper denture 100 to form a second modified upper denture 100a, shown in FIG. 3.

At step 6, the edges, such as along curved line 108 shown in FIG. 3, are trimmed or grinded down and generally the remaining pink section 102a is trimmed or grinded down to form a third modified upper denture, not shown.

Figure 4:
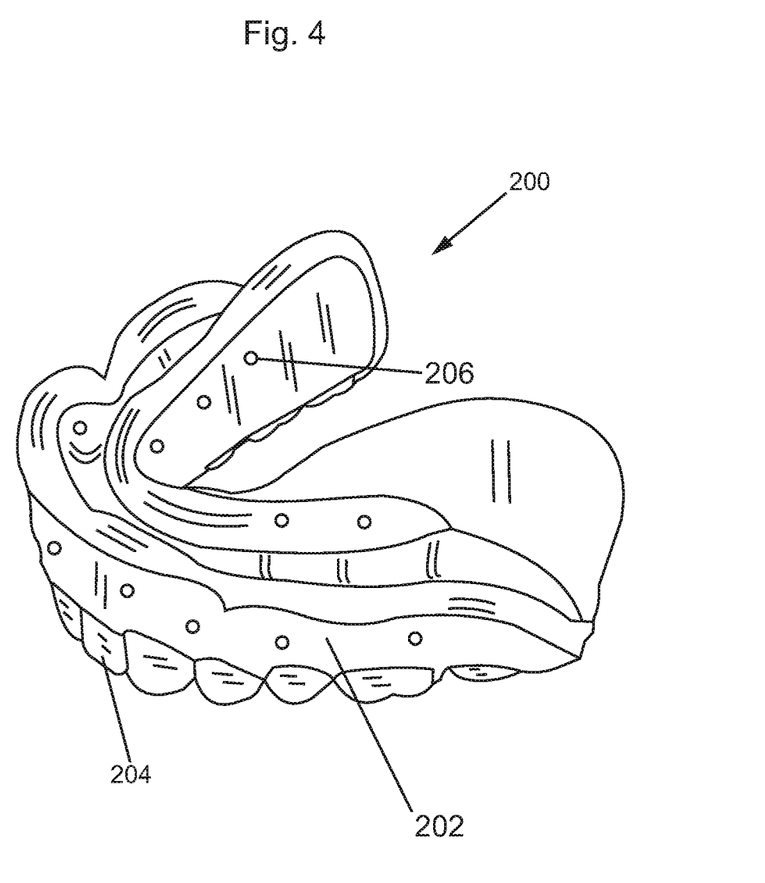
FIG. 4 is a bottom perspective view of a first modified lower denture in accordance with an embodiment of the present invention.

At step 8 a known lower denture, with teeth made of acrylic, and preferably with gums section made of nylon, preferably a flexible nylon, is modified to form first modified lower denture 200, shown in FIG. 4, by making a plurality of holes 206 in gums section, of the known lower denture. Other than the holes 206 the first modified lower denture 200 may be identical to a known lower denture, wherein the pink or gums section 202 is made of nylon, preferably a flexible nylon, and the teeth 204 are made of acrylic.

Each of the plurality of holes 206, preferably goes all the way through the section 202 so that one can see through the holes 206 though the section 202. Having holes 206 go all the way through section 202, in at least one embodiment, allows a gold and silicon mixture to enter the interior of the nylon section 202 in one or more later steps. The nylon section 202 may be referred to as a nylon frame.

At step 10, the first modified lower denture 200 is placed in a hard lower impression or model and the combination of the denture 200 and the hard lower impression or model is placed inside a jaw articulator as a bottom jaw portion. In addition, the third modified upper denture is placed in a hard upper impression or model and the combination of the third modified upper denture and the hard upper impression or model is placed in the jaw articulator as the upper jaw portion, while the bottom jaw portion is located in the articulator.

At step 12, wax is applied some to all outside surface areas of pink section, i.e. trimmed section 102a, of the third modified upper denture; wax is inserted into openings 106; and additional wax is used to form a new palate section supported by the upper hard impression, thereby forming a fourth modified upper denture, not shown, having a palate section in the upper hard impression or model, located in the articulator. In addition, wax is applied to all outside surface areas of pink section 202 of the first modified lower denture 200 and wax is inserted into openings 206 to form a second modified lower denture.

At step 14, the fourth modified upper denture, not shown, and upper hard impression or model are placed inside a first half of a first metal flask, and wet plaster is inserted into the first half of metal flask to surround and hold the upper hard impression or model in place. In addition, the second modified lower denture, not shown, and lower hard impression or model are placed inside a first half of a second metal flask, and wet plaster is inserted into the first half of the second metal flask to surround and hold the lower hard impression or model in place.

At step 16, shown in FIG. 1B, after the wet plaster added in step 14 hardens, second halves of the first and second metal flasks are placed on top of the first halves of the first and second metal flasks, respectively, and wet plaster is poured on top of the fourth modified upper denture and the second modified lower denture in the first and second metal flasks, respectively.

At step 18, after the wet plaster added in step 16 hardens, the assembled metal flasks (includes both halves assembled together), with the fourth modified upper denture in the hard upper impression or model in the first flask and the second modified lower denture in the lower hard impression or model in the second flask are placed in boiling water to heat up the wax of the fourth modified upper denture, and the second lower modified denture, respectively.

At step 20, shown in FIG. 1B, after heating sufficiently, the wax melts and pours out, the two halves of the first and second metal flasks are taken apart, one half of the first flask having a fifth modified upper denture (without wax or substantially without wax, after pouring out wax, and rinsing out leftover wax) encased in hardened plaster, the other half of the first flask having the hard upper impression or model encased in hardened plaster; one half of the second flask having a third modified lower denture (without wax or substantially without wax, after pouring out wax, and rinsing out leftover wax) encased in hardened plaster, the other half of the second flask having the hard lower impression or model encased in hardened plaster.

At step 22, shown in FIG. 1B, after the wax is poured out and rinsed out, a gold and silicon mixture is added to fill the voids left by the wax. The gold and silicon mixture, in at least one embodiment, may be formed with gold kneaded or mixed in a dough of silicon or as a liquid, with 2% gold by weight to 98% silicon by weight, but may be a higher percentage of gold if cost is not a factor. The two halves of the first flask, with the fifth modified upper denture and the hard impression or model, are put back together; and the two halves of the first flask with the third modified lower denture and the hard lower impression or model are then put back together. The two halves of the first flask and the two halves of the second flask, may be put back to together before inserting the gold and silicon mixture, when an injection method to inject for example a gold and silicon is a liquid mixture into the voids left by the wax that has been removed.

At step 24 the gold and silicon mixture is allowed to cure and/or harden inside of the two flasks to form a sixth modified upper denture and a fourth modified lower denture, respectively.

The gold and silicon mixture takes up all the space where wax used to be. The gold and silicon mixture will thus form a palate section made entirely of gold and silicon, for palate section 302b in FIG. 5 for the final upper denture 300. The gold and silicon mixture will be inserted into spaces where holes 106 were located, since the wax in those areas is now gone; and the gold and silicon mixture will also cover all outer surfaces of sections 302, 302a, and 302b shown in FIG. 5, with a nylon material (from the known upper denture) underneath a layer of silicon and gold mixture for section 302a. The final upper denture 300 typically includes a plurality of acrylic teeth 304.

At step 26, the hardened plaster (with sixth modified upper denture within) is taken out of the first flask and the hardened plaster (with the fourth modified lower denture within) is taken out of the second flask.

At step 28, the sixth modified upper denture and the fourth modified lower dentures are removed from inside of their respective hardened plaster shells by breaking the appropriate plaster shells in which they are encased.

Figure 5:
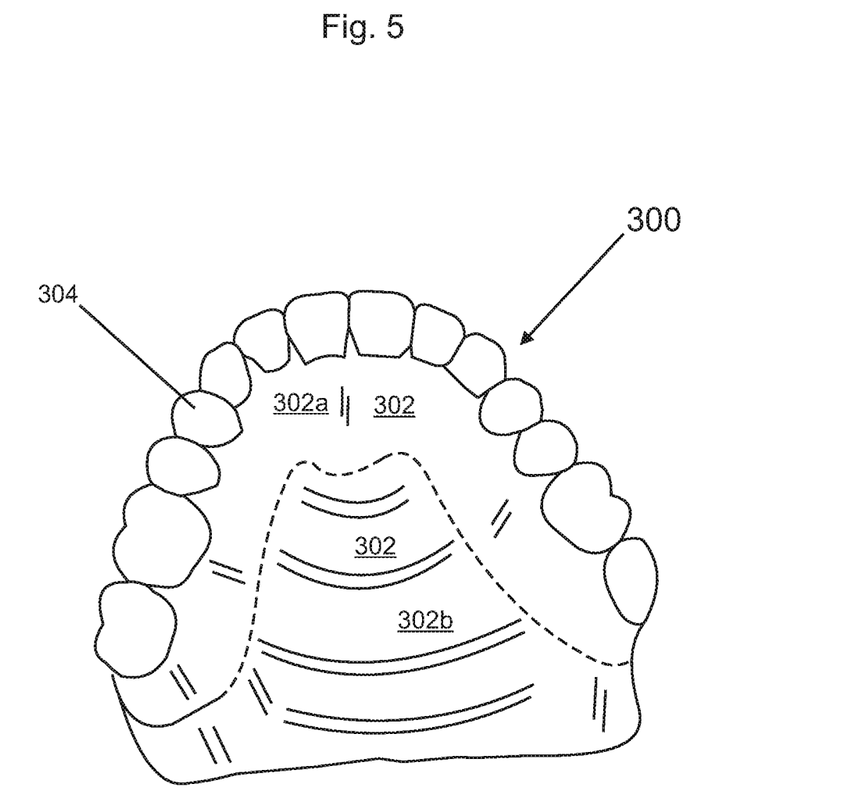
FIG. 5 is a bottom perspective view of a final upper denture in accordance with an embodiment of the present invention.

At step 30, the sixth modified upper denture is trimmed and polished to form the final upper denture 300 shown in FIG. 5. The final upper denture 300 includes a section or portion 302, having sections 302a and 302b. The section 302a has a silicon and gold mixture covering a nylon inner material. The nylon inner material is flexible. The section or palate section 302b is made entirely or substantially entirely of a silicon and gold mixture. Teeth 304 are shown which are typically made of acrylic.

Figure 6:
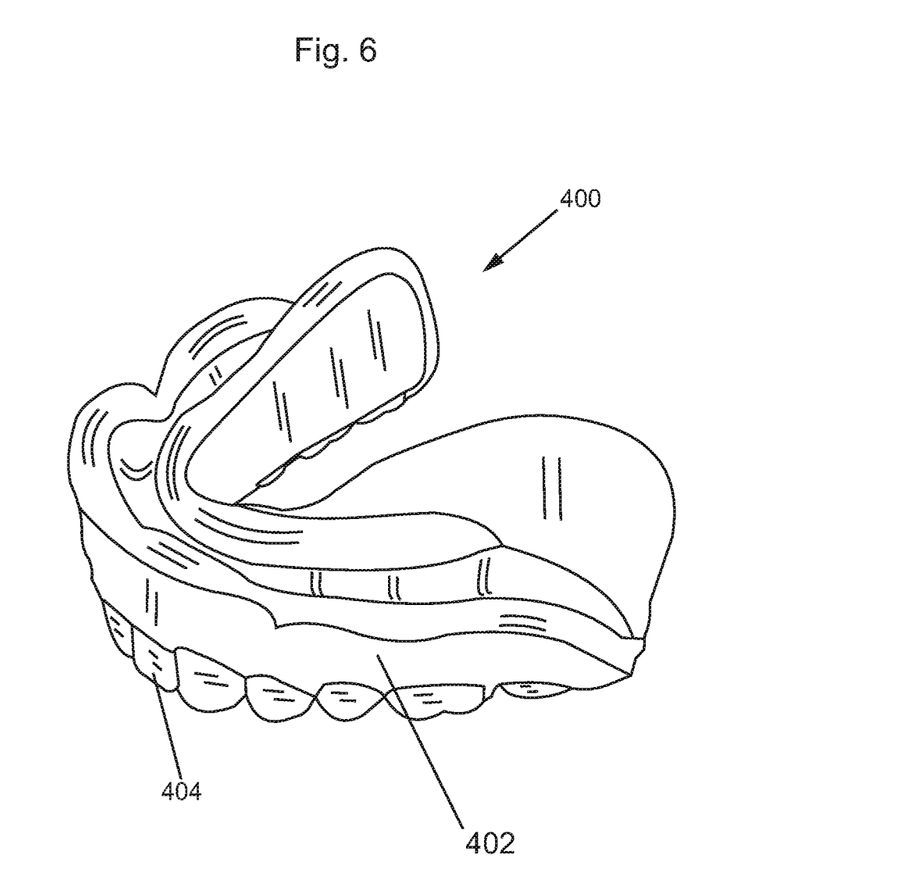
FIG. 6 is a bottom perspective view of a final lower denture in accordance with an embodiment of the present invention.

In addition, the fourth modified lower denture is trimmed and polished to form final lower denture 400 shown in FIG. 6. The final lower denture 400 includes a section or portion 402 which has a silicon and gold mixture covering a nylon inner material. The nylon inner material is flexible. Teeth 404 are shown which are typically made of acrylic.

One skilled in the art would recognize that one or more of the steps of the method of FIGS. 1A-1B are used for making known upper and/or lower dentures.

In other embodiments, the process referred to in FIGS. 1A-1B may be configured to be done for a denture implant bridge.

The method or process shown in FIGS. 1A-1B may provide a near 100% perfect fit for the final upper denture 300 and the final lower denture 400, constructing in accordance with the method of FIGS. 1A-1B.

Generally, patients won't have any pain and/or pain is minimal because the final upper denture 300 and the final lower denture 400, have a flexible gums section or frame (section 302 for denture 300 and section 402 for denture 400) made of nylon in at least one embodiment, and there is little or no abrasion to the tissue in the mouth. It is critical in at least one embodiment that the gums section 302a of the final modified upper denture 300 and the gums section 402 of the final lower denture 400, be made of a nylon inner material, with a gold and silicon mixture covering all outer surfaces of sections 302 and 402. This provides both flexibility from the nylon material, and anti-bacterial properties from the user of gold.

The palate 302b of the final upper denture 300 is flexible (made entirely of gold and silicon mixture) and the palate 302b therefore will suction on to the top of a person's mouth and won't fall out randomly. The upper final modified denture 300 and the final lower denture 400 are also more comfortable for patients with sensitive mouths.

It is critical, in at least one embodiment, that the holes 106 in FIG. 2, go all the way the section 102a from the bottom to the top of the first modified upper denture 100 and the holes 206 go all the way through the section 202 of the first modified lower denture 200 shown in FIG. 4.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising:
    modifying a known upper denture to form a first modified upper denture by making holes in a gums section of the known upper denture, wherein the known upper denture includes a gums section made of a first material, a palate section, and a plurality of teeth, and wherein the first modified upper denture includes a gums section, a palate section, and a plurality of teeth;
    modifying a known lower denture to form a first modified lower denture by making holes in a gums section of the known lower denture, wherein the known lower denture includes a gums section made of the first material, and a plurality of teeth, and wherein the first modified lower denture includes a gums section, and a plurality of teeth;
    modifying the first modified upper denture by removing the palate section of the first modified upper denture to form a second modified upper denture, wherein the second modified upper denture includes a gums section and a plurality of teeth;
    trimming the second modified upper denture to form a third modified upper denture, wherein the third modified upper denture includes a gums section and a plurality of teeth;
    putting the third modified upper denture into a hard upper impression;
    putting the first modified lower denture into a hard lower impression;
    placing the third modified upper denture, while in the hard upper impression, into an artificial jaw articulator so that the third modified upper denture and hard upper impression act as an upper jaw;
    placing the first modified lower denture, while in the hard lower impression, into the artificial jaw articulator so that the first modified lower denture and the hard lower impression act as a lower jaw;
    applying wax to outer surfaces of the gums section of the third modified upper denture, and using additional wax to form a new palate section, thereby forming a fourth modified upper denture including a gums section covered with wax, a palate section made of wax, and a plurality of teeth;
    applying wax to outer surfaces of the gums section of the first modified lower denture thereby forming a second modified upper denture including a gums section covered with wax, and a plurality of teeth;
    putting the fourth modified upper denture and hard upper impression inside a first half of a first flask, and inserting wet plaster into the first half of the first flask so that the wet plaster in the first half of the first flask surrounds the hard upper impression;
    putting the second modified lower denture and hard lower impression inside a first half of a second flask, and inserting wet plaster into the first half of the second flask so that the wet plaster in the first half of the second flask surrounds the hard lower impression;
    after the plaster in the first half of the first flask dries, putting the second half of the first flask on top of the first half of the first flask, and pouring wet plaster on top of the fourth modified upper denture;
    after the plaster in the first half of the second flask dries, putting the second half of the second flask on top of the first half of the second flask, and pouring wet plaster on top of the second modified lower denture;
    after the plaster in the second half of the first flask has dried, applying heat to the first flask so that the wax of the fourth modified upper denture melts and further comprising removing the melted wax of the fourth modified upper denture to form a fifth modified upper denture having voids where the wax of the fourth modified upper denture was located;
    after the plaster in the second half of the second flask has dried, applying heat to the second flask, so that the wax of the second modified lower denture melts and further comprising removing the melted wax from the second modified lower denture to form a third modified lower denture having voids where the wax of the second modified lower denture was located;
    applying a gold and silicon mixture to the fifth modified upper denture to form a sixth modified upper denture having a gums section comprised of a mixture of gold and silicon covering the first material, wherein the first material differs from the mixture of gold and silicon, a palate section of the mixture of gold and silicon, and a plurality of teeth;
    applying the gold and silicon mixture to the third modified lower denture to form a fourth modified lower denture having a gums section comprised of a mixture of gold and silicon covering the first material, wherein the first material differs from the mixture of gold and silicon; and a plurality of teeth;
    removing the sixth modified upper denture from hardened plaster and trimming the sixth modified upper denture to form a final upper denture; and
    removing the fourth modified lower denture from hardened plaster and trimming the fourth modified lower denture to form a final lower denture.

2. The method of claim 1 wherein
the first material is nylon.

3. A method of modifying one or more known dentures to form one or more final dentures comprising:
    making holes in a gums section made of a first material of a known upper denture, wherein the known upper denture includes an original palate section connected to the gums section along a curved line;

cutting away the original palate section of the known upper denture to separate the original palate section from the gums section and from a remaining part of the known upper denture along the curved line;

and applying a gold and silicon mixture to make a new palate section, to insert into the holes made in the gums section of the known upper denture which remain in the remaining part of the known upper denture, and to cover the first material of the known upper denture which remains in the remaining part of the known upper denture to form a first modified upper denture; and wherein the original palate section as part of the known upper denture spans an area which is configured to cover a center of a hard palate of a person's mouth when the known upper denture is used as an upper denture in the person's mouth; and wherein the new palate section as part of the first modified upper denture spans an area which is configured to cover the center of the hard palate of the person's mouth when the first modified upper denture is used as an upper denture in the person's mouth.

4. The method of claim 3 further comprising:

making holes in a gums section made of a first material of a known lower denture; and and applying a gold and silicon mixture to insert into the holes in the gums section of the known lower denture which remains after the holes made in the known lower denture, and to cover the first material of the known lower denture which remains after the holes have been made in the known lower denture.

5. The method of claim 4 wherein
the first material is nylon.

6. The method of claim 3 wherein
the first material is nylon.

7. The method of claim 3 wherein
the known upper denture includes a plurality of teeth which includes a left rearmost tooth, a plurality of further teeth, and a right rearmost tooth; and wherein the curved line spans from a left location which is nearer the left rearmost tooth than any other tooth of the plurality of teeth to a right location which is nearer the right rearmost tooth than any other tooth of the plurality of teeth.

8. The method of claim 3 further comprising
trimming the remaining part of the known upper denture after cutting away the original palate section and before applying the gold and silicon mixture.

9. The method of claim 8 further comprising
putting the remaining part of the known upper denture into a hard impression; and placing the remaining part of the known upper denture, while in the hard upper impression, into an artificial jaw articulator so that the remaining part of the known upper denture and the hard upper impression act as an upper jaw, after the remaining part of the known upper denture has been trimmed and before applying the gold and silicon mixture.

10. The method of claim 9 further comprising
applying wax to outer surfaces of the gums section of the known upper denture which remain in the remaining part of the known upper denture, after placing the remaining part of the known upper denture, while in the hard upper impression, into the artificial jaw articulator and before applying the gold and silicon mixture.

11. The method of claim 10 further comprising
using additional wax to form a temporary palate section, thereby forming a first temporary modified denture including a gums section covered with wax, a palate section made of wax, and a plurality of teeth after applying wax to outer surfaces of the gums section of the known upper denture which remain in the remaining part of the known upper denture and before applying the gold and silicon mixture.

12. The method of claim 11 further comprising
putting the first temporary modified upper denture and the hard upper impression inside a first half of a first flask, and inserting wet plaster into the first half of the first flask so that the wet plaster in the first half of the first flask surrounds the hard upper impression, after using additional wax to form the temporary palate section and before applying the gold and silicon mixture.

13. The method of claim 12 further comprising
after the wet plaster in the first half of the first flask dries, putting a second half of the first flask on top of the first half of the first flask, and pouring wet plaster on top of the first temporary modified upper denture.

14. The method of claim 13 further comprising
after the plaster in the second half of the first flask has dried, and before applying the gold and silicon mixture, applying heat to the first flask so that the wax of the first temporary modified upper denture melts and further comprising removing the melted wax of the first temporary modified upper denture to form a second temporary modified upper denture having voids where the wax of the first temporary modified upper denture was located.

15. The method of claim 14 wherein
the gold and silicon mixture is applied to the voids where the wax of the first temporary modified upper denture was located to form the first modified upper denture.

16. The method of claim 15 further comprising
removing the first modified upper denture from hardened plaster and trimming the first modified upper denture, and the gold and silicon mixture is applied.

* * * * *